United States Patent [19]

Hara

[11] Patent Number: 4,653,155
[45] Date of Patent: Mar. 31, 1987

[54] WIRE BUNDLING HARNESS

[75] Inventor: Kunio Hara, Kawasaki, Japan

[73] Assignee: Nifco, Inc., Yokohama, Japan

[21] Appl. No.: 772,368

[22] Filed: Sep. 4, 1985

[30] Foreign Application Priority Data

Sep. 7, 1984 [JP] Japan .................................. 59-187361

[51] Int. Cl.⁴ .......................................... B65D 63/14
[52] U.S. Cl. ................................. 24/16 PB; 248/74.3
[58] Field of Search ............ 24/16 R, 16 PB, 30.5 R, 24/30.5 P, 30.5 L, 115 H, 115 K, 115 G, 136 K, 136 L, 481, 482, 703; 292/307, 320, 321, 322, 323, 324, 325; 248/74.3

[56] References Cited

U.S. PATENT DOCUMENTS

| | | | |
|---|---|---|---|
| 1,141,977 | 6/1915 | Rogers | 24/115 G |
| 1,368,545 | 2/1921 | Childers | 24/30.5 R |
| 1,736,624 | 11/1929 | Richardson | 24/115 G |
| 2,951,273 | 9/1960 | Brenker | 24/30.5 L |
| 3,002,240 | 10/1961 | Laguerre | 24/30.5 L |
| 3,093,435 | 6/1963 | Johnson | 24/115 G X |
| 3,167,299 | 1/1965 | Ling | 24/115 G X |
| 3,353,227 | 11/1967 | Kabel | 24/16 PB |
| 3,530,544 | 9/1970 | Burniston | 24/16 PB |
| 4,156,574 | 5/1979 | Boden | 24/136 K X |
| 4,342,477 | 8/1982 | McClure | 242/307 R |

FOREIGN PATENT DOCUMENTS 822525 11/1951 Fed. Rep. of Germany ... 24/30.5 L
WO80/01504 7/1980 PCT Int'l Appl. ............... 24/136 L Primary Examiner—Kenneth J. Dorner
Assistant Examiner—James R. Brittain
Attorney, Agent, or Firm—Trexler, Bushnell & Wolters, Ltd.

[57] ABSTRACT

A wire bundling harness adapted for electrical wiring use, comprising a band to be wrapped around the wires, a buckle in which the band is inserted, and a metal slider which is slidably molded in the buckle as a molded-in part thereof to make it possible that a portion of the metal slider bites the band so that the band is prevented from being moved in the longitudinal direction of the band.

4 Claims, 13 Drawing Figures

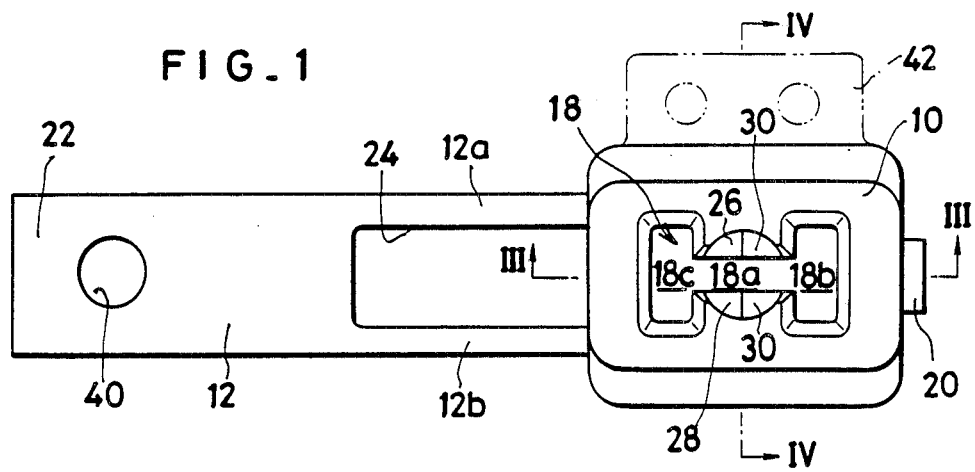
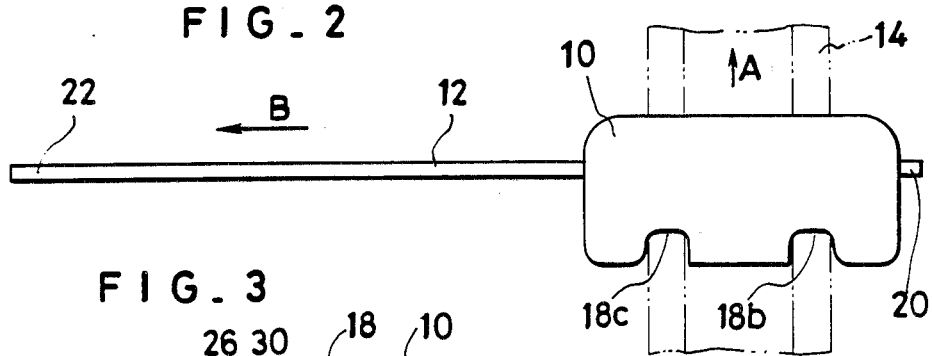
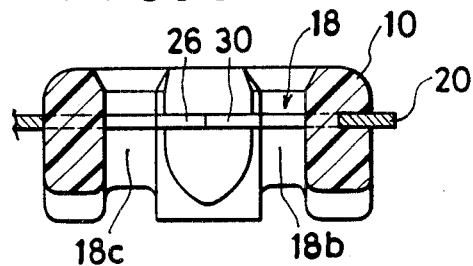
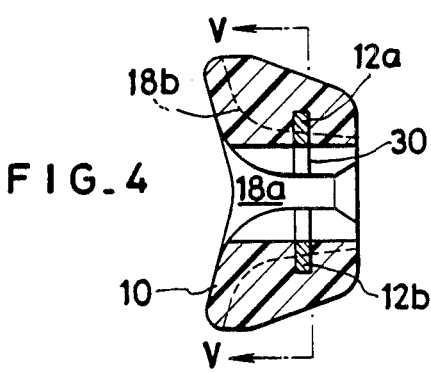
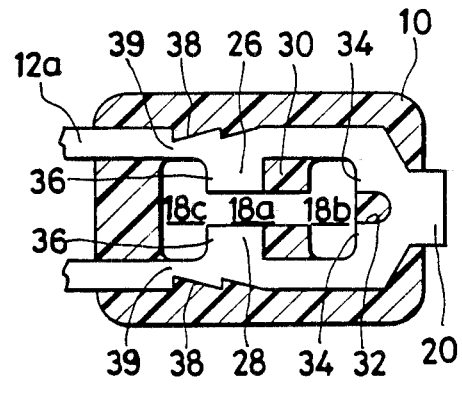

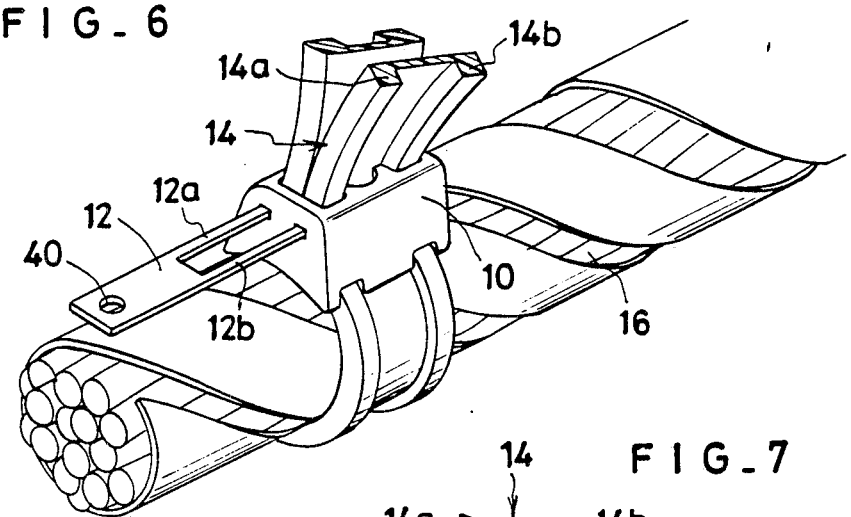
FIG_6
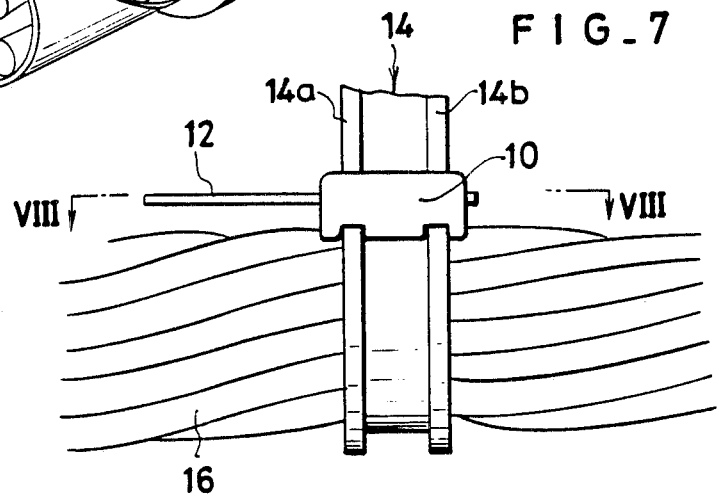
FIG_7
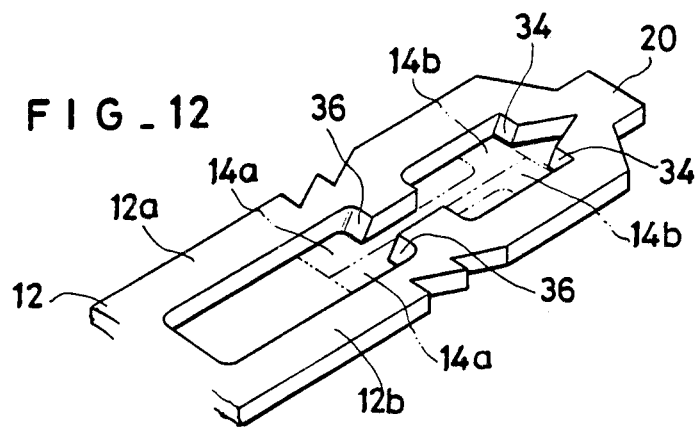
FIG_12

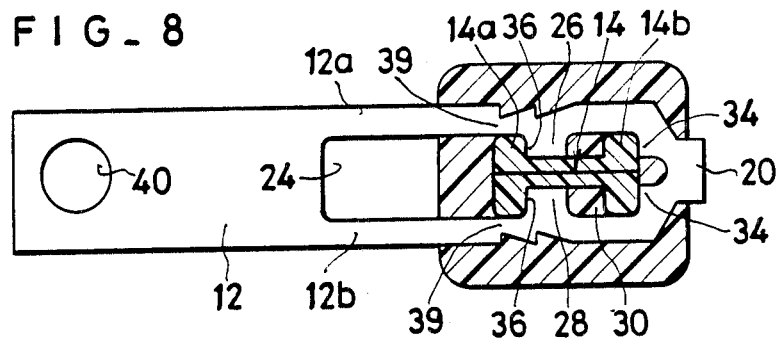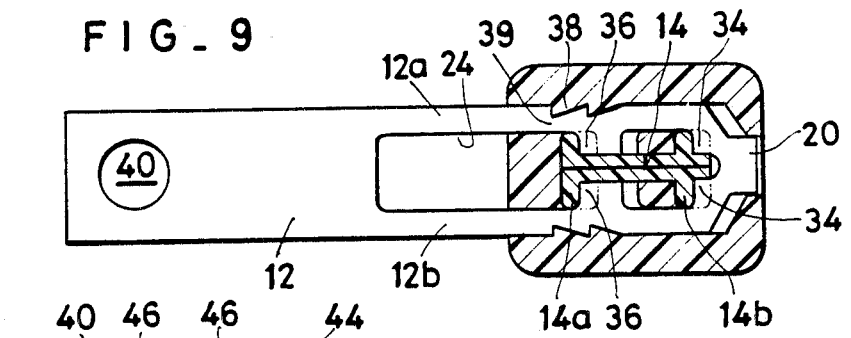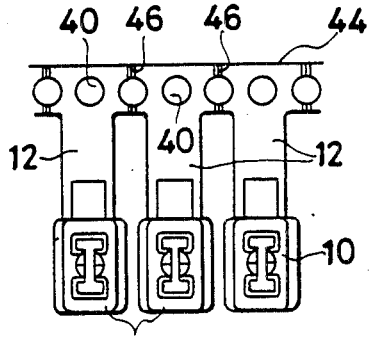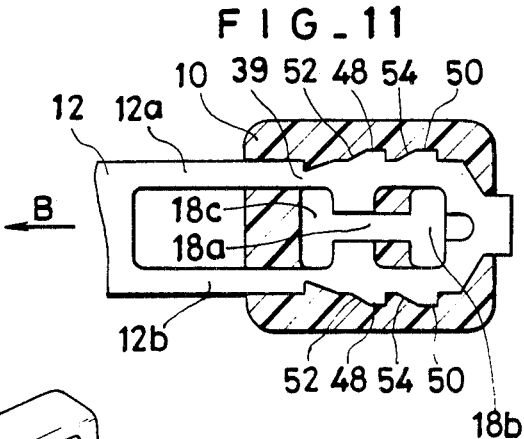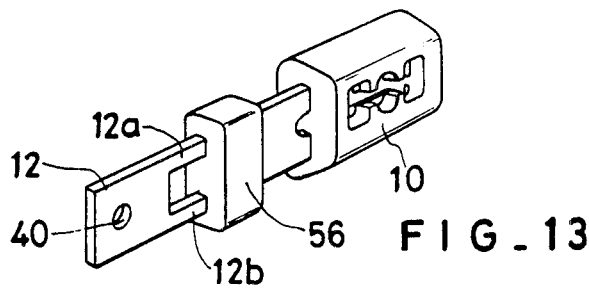

WIRE BUNDLING HARNESS

FIELD OF THE INVENTION AND RELATED ART STATEMENT

The present invention relates to a wire bundling harness adapted for bundling a plurality of cables, wires and the like.

Hitherto, various types of wire bundling harnesses, which are adapted for bundling a plurality of cables, wires and the like used in electrical wiring, have been proposed. An example of such conventional wire bundling harnesses is disclosed in Japanese Patent Publication SHO No. 54(1979)-36545, in which a band of the wire bundling harness is wrapped around a bundle of cables, both end portions of the band are inserted into a block of the wire bundling harness, and a pin is struck into the band in the thickness direction of the band so that the band is fixed to the block.

However, in the conventional wire bundling harness, since it is required to strike the pin thereof into the band in its thickness direction, the wire bundling harness is large in size so that it projects outwardly from the bundled cables and the like. Further, since the band to be penetrated by the pin has a relatively thin thickness, there is a fear of the wrapped band being loosened.

OBJECT AND SUMMARY OF THE INVENTION

It is an object of the present invention to provide a wire bundling harness which is small in size and performs a secure bundling operation of the cables, wires and the like.

The wire bundling harness according to the present invention is constructed of a band to be wrapped around a material to be bundled (hereinafter referred to as "the bundled material"), a buckle into which the band is inserted, and a metal slider which is a molded-in part of the buckle and is slidable therein to make it possible that a portion of the slider bites the band to prevent the same from being moved in its longitudinal direction after completion of the bundling operation with the wire bundling harness of the present invention.

In such bundling operation, the band is wrapped around the bundled material and then inserted into the buckle. Thereafter, the slider is slidably driven to bite the band in the buckle so that the band is securely fixed to the buckle to perform a secure bundling operation.

Other objects and features of this invention will be clear from the following detailed description made with reference to the accompanying drawings.

BRIEF DESCRIPTION OF THE DRAWINGS

FIG. 1 is a front view of a first embodiment of the wire bundling harness of the present invention;

FIG. 2 is a bottom view of the wire bundling harness of FIG. 1;

FIG. 3 is a sectional view taken along the line III—III of FIG. 1;

FIG. 4 is a sectional view taken along the line IV—IV of FIG. 1;

FIG. 5 is a sectional view taken along the line V—V of FIG. 4;

FIG. 6 is a perspective view of the wire bundling harness of the present invention in use;

FIG. 7 is a side view of the wire bundling harness of FIG. 6;

FIG. 8 is a sectional view taken along the line VIII—VIII of FIG. 7;

FIG. 9 is a sectional view similar to FIG. 8, in which the slider is shown in a condition in which it is strongly pulled;

FIG. 10 is a plan view of a second embodiment of the present invention, in which a plurality of the wire bundling harnesses are connected with each other in their sliders;

FIG. 11 is a sectional view of a third embodiment of the present invention, and similar to FIG. 8, in which essential parts of the wire bundling harness are shown;

FIG. 12 is a perspective view of a modification of a slider of a fourth embodiment of the wire bundling harness of the present invention; and FIG. 13 is a perspective view of a fifth embodiment of the wire bundling harness of the present invention.

DESCRIPTION OF THE PREFERRED EMBODIMENTS

In FIGS. 1 to 5, there is shown a first embodiment of the wire bundling harness of the present invention. The wire bundling harness is provided with a buckle 10 made of a synthetic resin, and a metal slider 12 which is a molded-in part of the buckle 10. In the wire bundling harness a band 14 is wrapped around the bundled material 16 as shown in FIGS. 6 and 7. The band 14 is thin in thickness, has a strap-like shape, and is made of a synthetic resin and provided with a pair of thick wall portions 14a, 14b in its opposite ends in its width direction. Both end portions of the band 14 in its longitudinal direction are inserted into the buckle 10, while a middle portion of the band 14 is clamped by the buckle 10.

As shown in FIG. 1, the buckle 10 is provided with an insertion hole 18 in which the end portions of the band 14 in its longitudinal direction are closely abutted against each other back to back so as to make it possible that the end portions of the band 14 are inserted into the insertion hole 18 of the buckle 10. The insertion hole 18 is constructed of a narrow center portion 18a and a pair of wide opposite portions 18b, 18c so that the insertion hole 18 has a substantially H-shaped configuration as a whole. As shown in FIG. 4, the insertion hole 18 of the buckle 10 is gradually enlarged in width toward its surface facing the bundled material 16 to make it possible that the buckle 10 approaches the bundled material 16 in a bundling operation of the wire bundling harness.

The slider 12 which is a molded-in part of the buckle 10 is slidable in a direction perpendicular to a direction "A" indicated by an arrow mark in FIG. 2, in which direction "A" is inserted the band 14 into the buckle 10. The slider 12 is formed from a metal plate, and slidably molded for ⅔ of its length between its front end portion 20 and its base portion 22 within the buckle 10. The front end portion 20 of the slider 12 is smaller in width than the middle portion of the slider 12 and projects outward from one end of the buckle 10 as shown in FIG. 1. However, as shown in FIG. 9, when the bundling operation of the wire bundling harness is completed, the front end portion 20 of the slider 12 is retracted into the buckle 10.

A through-hole 24 is provided in the slider 12 so as to extend between a portion in the vicinity of the front end portion 20 and the central portion of the slider 12, so that the middle portion of the slider 12 is divided into a pair of small width portions 12a, 12b. A pair of projecting tabs 26, 28 project inward from the small width portions 12a, 12b of the slider 12 so as to approach each other, whereby the width of the through-hole 24 of the slider 12 is partially reduced. These projecting tabs 26, 28 of the slider 12 are so arranged that the width of the narrow central portion 18a of the insertion hole 18 is reduced. Namely, as shown in FIGS. 1 and 4, the narrow central portion 18a is a circular column-like through-hole which is partially intercepted crosswise by the projecting tabs 26, 28. Consequently, in a molding process of the buckle 10 and its molded-in part, i.e., the slider 12, a pair of pressure pins are inserted into the narrow central portion 18a in both of right hand and left hand directions of FIG. 4 so as to be abutted on opposite sides of the slider 12 within the buckle 10, so that it is possible to prevent the slider 12 from being moved in its mold (not shown).

However, in the aforementioned molding process, since the projecting tabs 26, 28 of the slider 12 only cover ½ area of the narrow central portion 18a of the insertion hole 18 of the buckle 10, the remaining ½ area of the central portion 18a of the insertion hole 18 is filled with a synthetic resin to form a pair of projecting tabs 30 as shown in FIG. 1.

As shown in FIG. 5, a notch 32 is formed in the front portion 20 of the slider 12 so as to be adjacent to the through-hole 24 of the slider 12. The notch 32 is positioned in a central portion of the slider 12 in its width direction and extends toward a front end of the front end portion 20 of the slider 12. Both side portions of the notch 32 of the slider 12 and portions of the projecting tabs 26, 28, which face the wide portion 18c of the insertion hole 18, form biting portions 34 and 36 respectively, so that these biting portions 34 and 36 bite the thick wall portions 14b and 14a of the band 14 respectively when the slider 12 is slidably driven in a direction "B" indicated by an arrow mark in FIG. 2, whereby the band 14 is clamped in the buckle 10 of the wire bundling harness of the present invention.

In outside surfaces of the small width portions 12a, 12b of the slider 12, there are formed a plurality of notches 38 each of which forms a neck portion 39 having a smaller width. Consequently, when the slider 12 is slidably driven by a large force, the small width portion 12a, 12b are cut at the neck portions 39 so that only a portion of the slider 12 beyond the neck portions 39 thereof and extending toward the front end portion 20 of the slider 12 remains in the buckle 10. Therefore, it is preferable to form the notches 38 of the slider 12 in the vicinity of the wide portion 18c of the insertion hole in the molding process of the buckle 10 in which the slider 12 is slidably molded as its molded-in part, to ensure that the above portion of the slider 12, which remains in the buckle 10 after the small width portions 12a, 12b are cut, does not project outward from the buckle 10.

In the base portion of the slider 12 which portion is opposite to the front end portion 20, there is formed a circular hole 40 which is adapted for receiving a pin of a bundling jig (not shown).

Now, an action of the embodiment of the wire bundling harness of the present invention will be described.

The slider 12 is integrally formed with the buckle 10 in molded-in manner. As shown in FIGS. 6 and 7, the band 14 is wrapped around the bundled material 16 and then inserted into the insertion hole 18 of the buckle 10 in its opposite end portions. After that, the buckle 10 is urged toward the bundled material 16 while the opposite end portions of the band 14 are held by the user, so that a tensile force is applied to the middle portion of the band 14. Thereafter, the slider 12 is pulled by the bundling jig (not shown) in the direction "B" in FIG. 2, so that, as shown in FIG. 9, the biting portions 34 and 36 bite the thick wall portions 14b, 14a of the band 14 respectively, whereby the band 14 is prevented from being moved in its longitudinal direction to be fixed to the buckle 10 so that the bundled material 16 is bundled by the wire-bundling harness. Especially, since the band 14 is subjected to an elongation action effected by the biting portions 34, 36 of the slider 12, molecules of the band 14 are oriented so that the band 14 is enhanced in its material strength.

Further, since each of the notches 38 of the small width portions 12a, 12b of the slider 12 has an oblique surface, the biting portions 36 of the slider 12 strongly bite the band 14.

Under such circumstances, when the pulling force applied to the slider 12 in the direction "B" in FIG. 2 is increased, the slider 12 is cut around its notches 38 shown in FIG. 9 so that the front end portion 20 of the slider 12 remains in the buckle 10 while the other portions of the slider 12 are separated from the buckle 10. Since the biting portions 34, 36 of the slider 12 stay in their biting positions with respect to the band 14, there is no change in wrapping conditions of the band 14 after the slider 12 is cut.

Incidentally, as shown in chain lines in FIG. 1, in case where an anchor plate 42 is provided in the buckle 10 in projecting manner to make it possible that the buckle 10 is mounted on a panel (not shown), it is possible to bundle the bundled material 16 and to mount the thus bundled material 16 on the panel (not shown) by the use of the wire bundling harness of the present invention.

In FIG. 10, there is shown a second embodiment of the wire bundling harness of the present invention.

In the second embodiment of the wire bundling harness, a plurality of the sliders 12 of the first embodiment are connected with each other in use. Namely, the sliders 12 project in parallel with each other from a strip-like plate member 44 in a direction perpendicular to the longitudinal direction of the strip-like plate member 44, a front end portion of each of which sliders 12 is inserted into each of the buckles 10 in the molding process thereof.

In portions of the strip-like plate member 44 between the adjacent sliders, there are provided in the width direction of the strip-like plate member 44 a plurality of V-shaped grooves 46 being cut later to make it possible that each pair of the sliders 12 and the buckles 10 are independently used as a single wire bundling harness.

In FIG. 11, there is shown a third embodiment of the wire bundling harness of the present invention, in which the slider 12 is modified.

In this embodiment of the wire bundling harness, projecting tabs 48, 50 are provided in outer surfaces of the small width portions 12a, 12b of the slider so as to project outward therefrom. These projecting tabs 48 and 50 of the slider 12 are provided respectively with oblique portions 52 and 54 which are engaged with the buckle 10 at the time the slider 12 is pulled in the direction "B" shown in FIG. 11 so as to cause the small width portions 12a, 12b of the slider 12 to approach each other, so that a securing force of the band 14 is increased.

In FIG. 12, there is shown a fourth embodiment of the wire bundling harness of the present invention, in which the biting portions 34 and 36 of the slider 12 are provided with surfaces inclined at sharp angles with respect to a sliding direction of the slider 12 so that they easily bite the thick wall portions 14b and 14a of the band 14 in the bundling operation of the wire bundling harness.

In FIG. 13, there is shown a fifth embodiment of the wire bundling harness of the present invention.

In this fifth embodiment of the wire bundling harness, an urging block 56 is fixed to the middle portion of the slider 12 which extends from the buckle 10, in which urging block 56 the slider 12 is provided with further narrower portions similar to the neck portions 39 of the first embodiment, so that the small width portions 12a, 12b of the slider 12 of this fifth embodiment are cut at such further narrower portions of the slider 12 in the bundling operation of the wire bundling harness. Consequently, in this fifth embodiment, the urging block 56 is connected with the buckle 10. Therefore, after completion of the bundling operation of the wire bundling harness, when the urging block 56 is urged to approach the buckle 10, the slider 12 remaining in the buckle 10 returns to its initial condition again to make it possible to withdraw the band 14 from the insertion hole 18 of the buckle 10 so that the bundled material 16 is released from its bundled condition.

As described above, the wire bundling harness of the present invention has a construction in which the buckle 10 is provided so as to be penetrated by the band 14 which is wrapped around the bundled material 16, and the metal slider 12 is slidably molded as a molded-in part of the buckle 10 so that a portion of the metal slider 12 bites the band 14 within the buckle 10 when the metal slider 12 is slidably driven in the bundling operation of the wire bundling harness. Therefore, the wire bundling harness of the present invention has a remarkable effect that it performs the bundling operation without any failure, though it is small in size.

What is claimed is:

1. A wire bundling harness comprising a flexible band adapted to be wrapped around a bundle of elongated elements such as wires, a buckle of plastic resin material in which a looped section of said band is inserted, said band being channel-shaped having a web of predetermined thickness and a pair of upstanding flanges respectively along opposite longitudinal edges of said web, said looped section of said band in said buckle having web areas in face-to-face relation with said flanges oppositely extending, thereby presenting a H-shaped cross section, and a metal slider in said buckle, said slider being disposed transversely of said band and having an elongated opening therein parallel to said band webs and embracing said looped sections of said band in said buckle, said slider hsaving internal edge portions adjacent said opening and biting into said looped band flanges upon sliding of said slider in said buckle to lock said looped band relative to said buckle, and said metal slider having a plurlity of external barbs adapted to bite into the material of said buckle to resist retrograde movement of said slider.

2. A wire bundling harness as set forth in claim 1 wherein said internal edge portions include a pair of projections extending into said opening in confronting relation spaced apart substantially twice the thickness of said web and laterally engageable with said flanges.

3. A wire bundling harness as set forth in claim 2 wherein said internal edge portions include a notch in an edge of said opening substantially twice as wide as the thickness of said web with the end of said opening engaging a pair of said flanges and said notch spanning the webs in face-to-face relation.

4. A wire bundling harness as set forth in claim 1 wherein said internal edge portions include a notch in an edge of said opening substantially twice as wide as the thickness of said web with the end of said opening engaging a pair of said flanges and said notch spanning the webs in face-to-face relation.

* * * * *